(12) United States Patent
Joa et al.

(10) Patent No.: US 8,862,512 B2
(45) Date of Patent: Oct. 14, 2014

(54) FINANCIAL TRANSACTION DATA PROFILE

(75) Inventors: David Joa, Irvine, CA (US); Kerry Cantley, Fort Mill, SC (US); Kurt D. Newman, Matthews, NC (US); Debashis Ghosh, Charlotte, NC (US)

(73) Assignee: Bank of America, Charlotte, NC (US)

( * ) Notice: Subject to any disclaimer, the term of this patent is extended or adjusted under 35 U.S.C. 154(b) by 688 days.

(21) Appl. No.: 12/712,862

(22) Filed: Feb. 25, 2010

(65) Prior Publication Data

US 2011/0208588 A1   Aug. 25, 2011

(51) Int. Cl.
*G06Q 40/00* (2012.01)
*G06Q 30/02* (2012.01)
*G06Q 40/02* (2012.01)

(52) U.S. Cl.
CPC ............ *G06Q 40/02* (2013.01); *G06Q 30/0258* (2013.01); *G06Q 40/12* (2013.01); *G06Q 40/00* (2013.01)
USPC .......................................................... 705/35

(58) Field of Classification Search
USPC .......................................................... 705/35
See application file for complete search history.

(56) References Cited

U.S. PATENT DOCUMENTS

| 5,433,483 | A  | * | 7/1995 | Yu ..................................... 283/58 |
| 5,740,271 | A  | * | 4/1998 | Kunkler et al. ............... 382/137 |
| 7,364,071 | B2 | * | 4/2008 | Esplin et al. .................. 235/383 |
| 7,729,990 | B2 | * | 6/2010 | Marceau et al. ................ 705/45 |
| 7,856,403 | B2 | * | 12/2010 | Venturo et al. ................. 705/45 |
| 2004/0254881 | A1 | * | 12/2004 | Kumar et al. .................. 705/40 |
| 2008/0167990 | A1 | * | 7/2008 | Grant ............................. 705/44 |
| 2009/0222364 | A1 | * | 9/2009 | McGlynn et al. ............... 705/30 |
| 2009/0276368 | A1 | * | 11/2009 | Martin et al. ............... 705/36 R |

* cited by examiner

Primary Examiner — Eric T Wong
(74) Attorney, Agent, or Firm — Moore & Van Allen, PLLC; Michael A. Springs; Patrick B. Horne (57) ABSTRACT

Embodiments of the invention include a method of developing a financial transaction data profile. Financial instruments are received as images, where the financial instruments include transactional data. The transactional data is extracted from the financial instruments and uploaded to a computer. The transactional data is organized so that the transactional data is grouped into categories. The categories are stored for presentation to the user in a financial transaction profile.

42 Claims, 8 Drawing Sheets

FINANCIAL TRANSACTION DATA PROFILE

FIELD

In general, embodiments of the invention relate to systems, methods, apparatuses, and computer readable mediums for reporting financial transactions. For example, some embodiments are directed to systems and methods for presenting and monitoring organized financial transaction data.

BACKGROUND

Consumers are often involved in many types of financial transactions on a weekly or even hourly basis. These financial transactions can be very difficult to track because they may vary considerably in scope, size, timing, and purpose. Financial institutions and other organizations may receive financial transaction information and present the information in a bank statement. The bank statements are often not organized or presented in a way that allows a bank customer to readily determine payment schedules, spending or saving trends, transactional categories, and the like.

Accordingly, there is a need to improve a user's ability to view and manage financial transaction data.

BRIEF SUMMARY

Methods, systems, and devices for monitoring, storing, and manipulating financial transaction data are generally disclosed. More particularly, methods for creating a financial transaction data profile on a computer system and providing the profile to a customer, a client, a bank account owner, an individual, an organization, or any other user are disclosed. The financial transaction data profile includes data extracted from the user's financial instruments that is organized and monitored according to certain preferences. Alerts and product recommendations based on the financial transaction data profile are also disclosed.

In another embodiment, a computerized method of developing a financial transaction data profile includes receiving a plurality of financial instruments, where the financial instrument includes transactional data. The transactional data is extracted from the plurality of financial instruments and uploaded to a computer. The transactional data is organized so that the transactional data is grouped into categories. The categories are stored for presentation to the user in a financial transaction profile.

In one embodiment of the method, the method of developing a financial transaction data profile includes receiving a plurality of images where each image represents a different financial instrument. Each financial instrument includes a payee name such that the payee name is embedded in each image. Each image is scanned to extract the payee name into text. The images and each associated payee name are then saved to a computer system and organized into categories associated with each payee name such that all images having the same payee name are grouped together into a common category. The categories are stored in the computer system for presentation to the user in a financial transaction data profile.

In another embodiment of the method, product or service recommendations are selected based on the financial transaction data profile.

In another embodiment of the method, the product or service recommendations are sent to the users.

In another embodiment, an apparatus for developing a financial transaction data profile includes a processor. The processor is configured to scan a plurality of images, each image representing a financial instrument. The financial instrument includes transactional data. The processor is also configured to extract the transactional data embedded in the plurality of images and organizes the transactional data from the plurality of images so that the transactional data is grouped into at least one category. The processor then stores each category for presenting to the user in a financial transaction data profile.

In another embodiment, a computer readable medium for developing a financial transaction data profile having computer program code embodied therein is provided. The program code, when executed on a computer, causes the computer to implement a method. The method including extracting transactional data from a plurality of financial instruments. The transactional data is then organized so that the transactional data is grouped into categories. The categories are stored for presentation to the user in a financial transaction profile.

In another embodiment, a system for developing a financial transaction profile includes a computer comprising at least one module to scan a plurality of images. Each image represents a financial instrument, where each financial instrument comprises transactional data. The module also converts the transactional data embedded in the images into a series of characters or numbers and organizes the transactional data from the plurality of images so that the transactional data is grouped together into categories.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Embodiments of the present invention are described below with reference to flowchart illustrations and/or block diagrams of such methods and apparatuses. It will be understood that blocks of the flowchart illustrations and/or block diagrams, and/or combinations of blocks in the flowchart illustrations and/or block diagrams, can be implemented by computer-executable program instructions (i.e., computer-executable program code). These computer-executable program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks. As used herein, a processor may be "configured to" perform a certain function in a variety of ways, including, for example, by having one or more general-purpose circuits perform the function by executing one or more computer-executable program instructions embodied in a computer-readable medium, and/or by having one or more application-specific circuits perform the function.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. In the context of this document, a computer-readable storage medium may be any medium that can contain or store data, such as a program for use by or in connection with an instruction execution system, apparatus, or device. The computer-readable medium may be a transitory computer-readable medium or a non-transitory computer-readable medium.

A transitory computer-readable medium may be, for example, but not limited to, a propagation signal capable of carrying or otherwise communicating data, such as computer-executable program instructions. For example, a transitory computer-readable medium may include a propagated data signal with computer-executable program instructions embodied therein, for example, in base band or as part of a carrier wave. Such a propagated signal may take any of a variety of forms, including, but not limited to, electro-magnetic, optical, or any suitable combination thereof. A transitory computer-readable medium may be any computer-readable medium that can contain, store, communicate, propagate, or transport program code for use by or in connection with an instruction execution system, apparatus, or device. Program code embodied in a transitory computer-readable medium may be transmitted using any appropriate medium, including but not limited to wireless, wireline, optical fiber cable, radio frequency (RF), etc.

A non-transitory computer-readable medium may be, for example, but not limited to, a tangible electronic, magnetic, optical, electromagnetic, infrared, or semiconductor storage system, apparatus, device, or any suitable combination of the foregoing. More specific examples (a non-exhaustive list) of the non-transitory computer-readable medium would include, but is not limited to, the following: an electrical device having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It will also be understood that one or more computer-executable program instructions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program instructions for carrying out operations of embodiments of the present invention are written in conventional procedural programming languages, such as the "C" programming languages and/or similar programming languages. The computer program instructions may alternatively or additionally be written in one or more multi-paradigm programming languages, such as, for example, F#.

The computer-executable program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.) or an embodiment combining software and hardware aspects that may all generally be referred to herein as a "module," "apparatus," or "system."

The following detailed description refers to the accompanying drawings which illustrate specific embodiments of the invention. Other embodiments having different structures and operations do not depart from the scope of the present invention.

It should be understood that terms like "bank," "financial institution," and just "institution" are used herein in their broadest sense. Institutions, organizations, or even individuals that process financial transactions are widely varied in their organization and structure. Terms like bank and financial institution are intended to encompass all such possibilities, including but not limited to, finance companies, stock brokerages, credit unions, mortgage companies, insurance companies, mobile carriers, etc. Additionally, disclosed embodiments may suggest or illustrate the use of agencies or contractors external to the financial institution to perform some of the calculations and data delivery services. These illustrations are examples only, and an institution or business can implement the entire invention on their own computer systems or even a single work station if appropriate databases are present and can be accessed.

Figure 1:
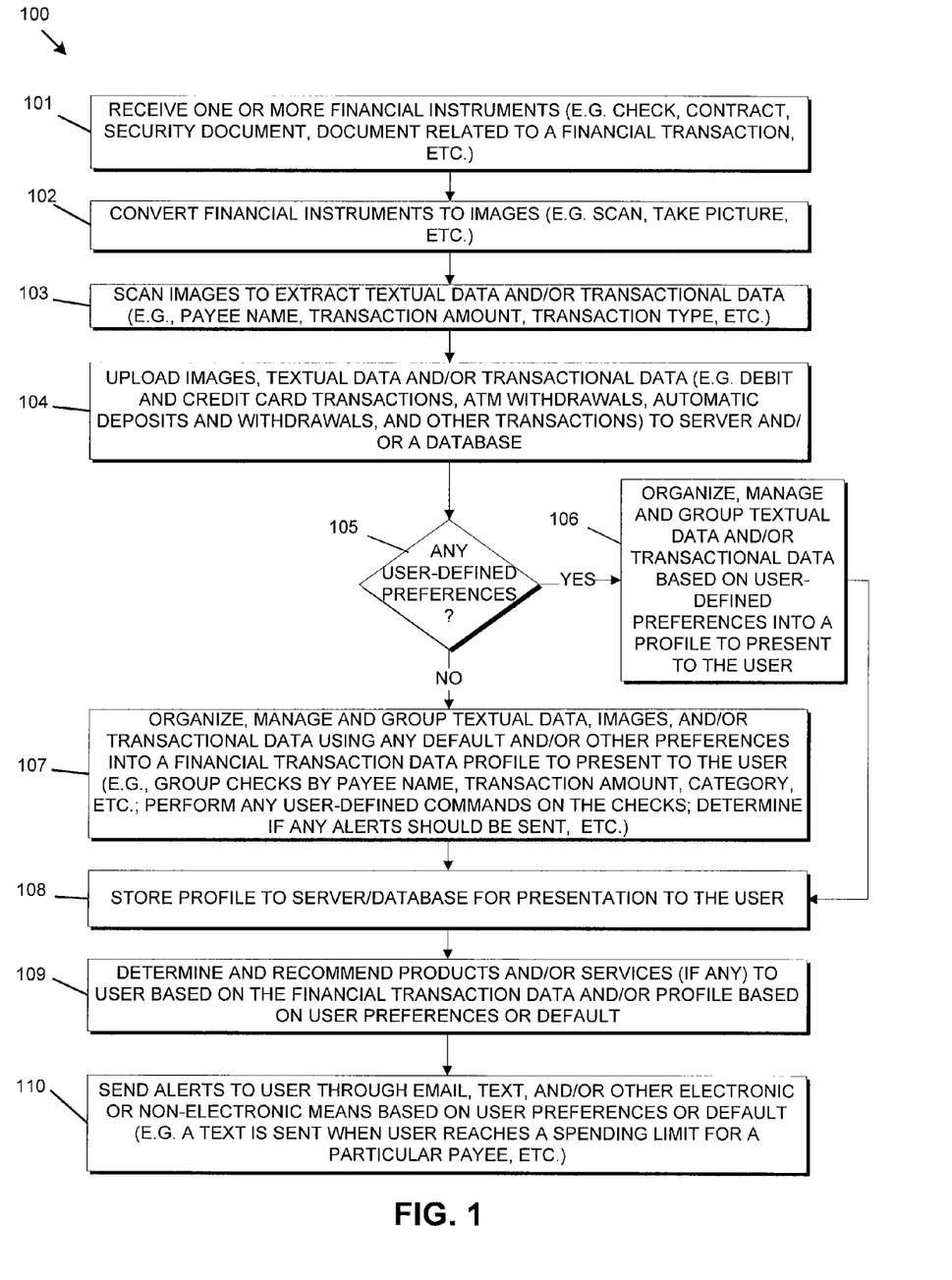
FIG. 1 is a flow chart of a method for a financial transaction data profile in accordance with an embodiment.
Figure 2:
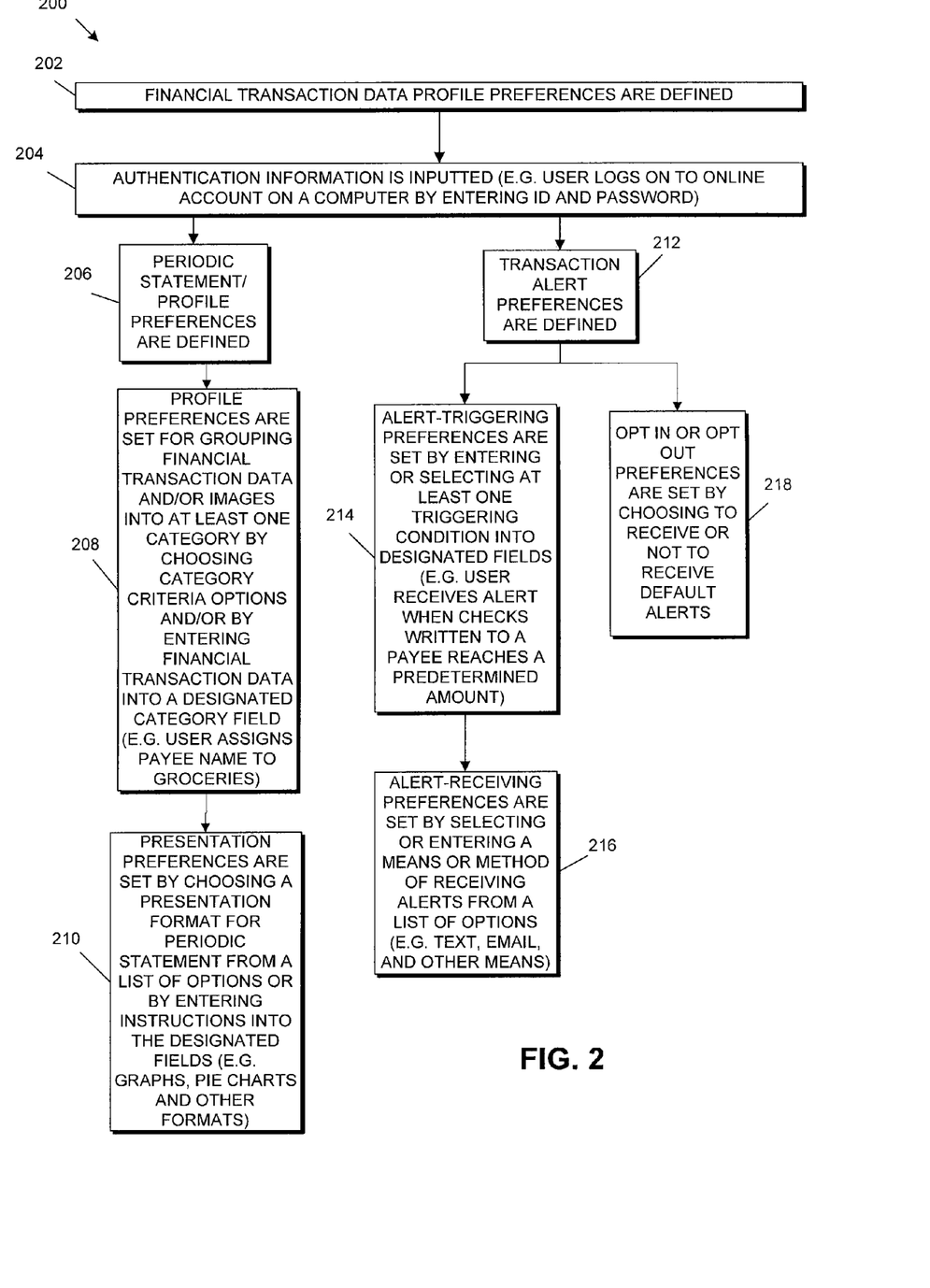
FIG. 2 is a flow chart of a method for creating a financial transaction data profile where a user sets preferences for the financial transaction data profile in accordance with an embodiment.
Figure 3:
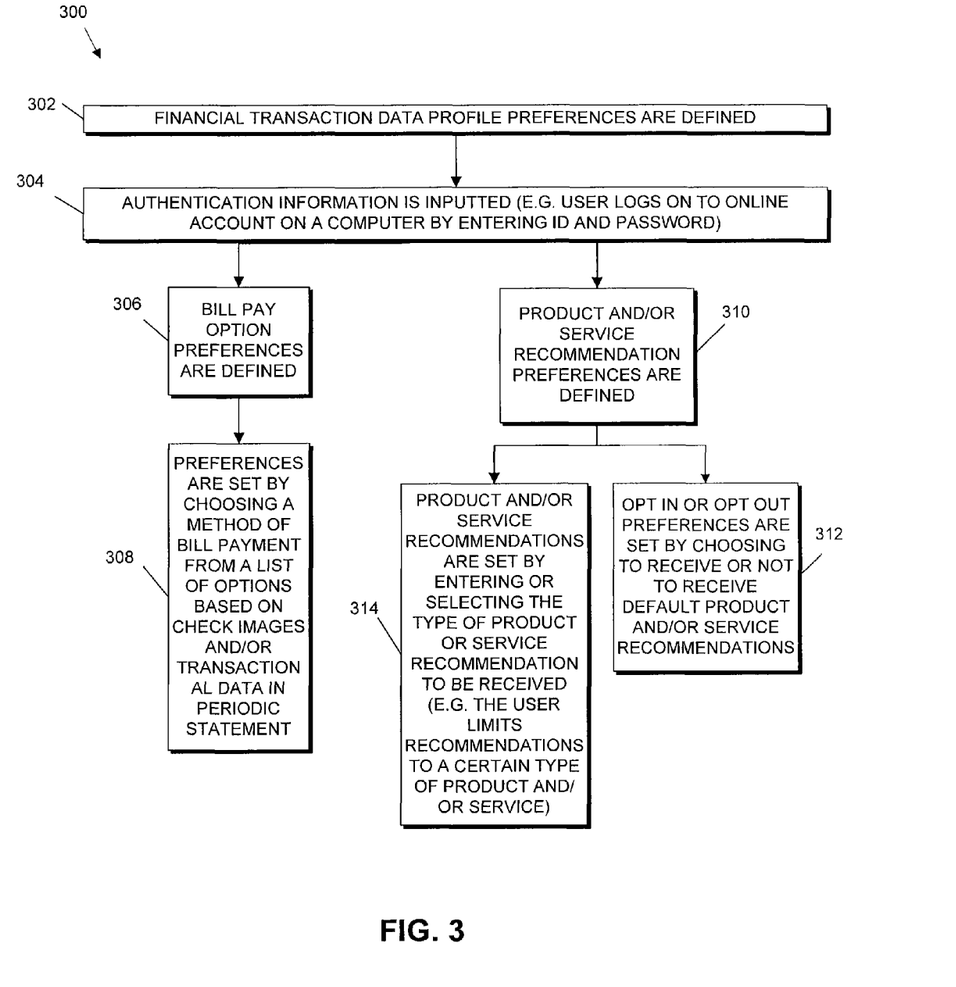
FIG. 3 is a flow chart of a method for creating a financial transaction data profile where a user sets preferences for the financial transaction data profile in accordance with an embodiment.

FIGS. 1-3 illustrate methods 100-300 for a financial transaction profile in accordance with some embodiments. Each flow chart is divided into blocks illustrating actions or events that are undertaken by a financial institution, such as a bank, a third party, and/or a customer as described herein. Each flow chart represents an exemplary embodiment of the invention. It will be understood that, unless clearly stated herein otherwise, in other embodiments of the invention the actions or events may be performed in a different order or simultaneously. Likewise, in some embodiments of the invention, one or more of the actions or events may be removed, optional, added, and/or combined with one or more other actions or events.

In one embodiment, a financial transaction profile is a feature of any product or service offered by an entity to a user to allow the user or other entity to view, monitor, and manipulate financial transaction data. In some embodiments, the financial transaction data profile is a periodic statement, an interactive report, a bulletin, or any other means for displaying, analyzing, managing, monitoring, and organizing financial transaction data. The financial transaction profile may be a bank statement or "periodic statement," an "alert" system, or a "product and/or service recommendation" service as referred to herein. The periodic statement may be a budgeting tool offered by a retail store or any other product or service offered by an entity. Financial transaction profile is used herein as part of the description of the exemplary embodiments of the present invention. However, it should be understood that the financial transaction profile may refer to other products or services features and thus, should not be limited to the exemplary embodiments described herein.

Additionally, it should be noted that the financial transaction profile can be a profile with any entity, such as a financial institution, a cell phone service provider/store, a utilities provider, club memberships, retail stores, stores providing rental services/products, or any other entity with whom the user interacts. For example, a cell phone provider could issue a monthly report organizing cell phone use by caller name or allow a customer to select how the monthly bill is to be presented.

FIG. 1 provides a flow chart illustrating a financial transaction data profile process or method 100 in accordance with an exemplary embodiment. In block 101, an organization, such as a financial institution, receives a document containing financial transaction data. The document may be received via any manner, such as the financial institution receiving a check or other instrument at an ATM or at a financial institution branch.

In some embodiments, an image of the document(s) can be electronically received from a user. A user is a customer, a client, a bank account owner, or any person or organization with authority to access the financial transaction data profile or set user preferences. For example, the user can image all or a portion of the document (e.g., the user taking a picture of the document with the user's camera/phone, the user scanning the document, the user faxing the document as an image, etc.) and then, submit such image(s) to the financial institution for appropriate debit or credit processing. In some embodiments, the transaction documentation, such as a check, may have already been imaged and the user simply wants to add the check to the financial data profile. For example, if the check has been imaged by a financial institutional other than the user's financial institution managing the financial data profile, the user can transmit such image to the latter. Nonetheless, once a user images the document, the user transmits the image to the financial institution.

In some embodiments, the document is a financial instrument such as a check, a contract, a security document, or any other instrument related to a financial transaction. In another embodiment, the financial transaction data includes debit and credit card transactions, Automatic Teller Machine withdrawals, automatic deposits, and other financial transactions whether in document, electronic, or other form. A financial instrument having financial transaction data is used herein to describe various embodiments. Nonetheless, it should be understood that the methods described below apply to documents (or any other item) other than financial instruments and data other than financial transaction data.

In block 102, if the received financial instrument(s) are not already imaged or is not imaged properly, the financial instruments or other documents (e.g. a purchase receipt) are converted to images by any converting mechanism such as taking a digital picture of the document, scanning the document or any other method to obtain an image of a document. In one embodiment, all or a portion of one or more financial instruments are scanned or imaged using a scanning or imaging device at a bank, such as a scanner or camera at an ATM, a scanner or camera at a bank branch, and the like. In other embodiments, the financial instruments are already in image form and the financial institution is merely receiving these images. It should be understood that the financial institution may receive the image of the financial instruments in any manner, whether the financial instruments are received from the financial institution itself, from other financial institutions, from an individual, or from any other entity.

According to some embodiments, the transactional data appears to be in textual form to a human observer, but is recognized as an image by a computer system. The transactional data is embedded in the images such that the transactional data is a portion of each image and thus, is not selectable text that can be easily recognized and used by a computer system. For example, the payee name on the face of a check image may appear to be text to a viewer, but the name is actually a portion of the image.

In block 103, one or more received images are scanned to extract transactional data or to convert the transactional data from image format to text (e.g., a series of characters and/or numbers) that are can be read and manipulated by a computer system. In some embodiments, transactional data includes a payee name, a transaction amount, a transaction type, an account or reference number, or any other information found in a financial instrument. It should be understood that the financial transactional data (or transactional data), as used herein, refers to financial data contained in the financial instrument or the image, such as a deposit amount, a check amount, a charge amount, or any other numerical or textual data associated with a financial transaction. For example, the financial transactional data may include a note made in the memo line of a check indicating the purpose of the financial transaction.

The transactional data is uploaded to a server and/or database as illustrated in block 104. Financial instruments from which data is gathered are not limited to physical documents and may include electronic, virtual or other forms of data such as automatic deposits, electronic financial documents, and debit card transactions.

In block 105, a determination is made as to whether preferences exist for organizing, managing, and/or grouping the textual and/or transactional data into a financial transaction data profile.

In block 106, the extracted financial transaction data is organized, managed, and grouped in accordance with the user-defined preferences. For example, if the user desires to view all checks associated with the payee name on the checks, the method 100 allows for all images associated with the checks that have the same payee names to be grouped together and presented to the user is such format. The user determines the preferences to be used for the profile as discussed in more depth later with regard to FIGS. 2-3.

In block 107, the profile is organized, managed and grouped by default and/or other preferences into a financial transaction data profile to present to the user. In some embodiments, the default preference include any preferences followed by a financial institution or other organization such as grouping the images or transactional data by payee name, reporting the chronological or numerical order of the financial transactions, or organizing and presenting the data by any other predetermined approach. For example, checks may be grouped by payee name, transaction amount, category, and the like.

Also, any user-defined commands that relate to different financial transaction can be performed automatically by the financial institution (or other entity). This allows a user to select a function that the user desires to be performed, such as saving in "My tax folder" all payment transactions with specific payments, and allows the financial institution to perform such operation when processing the transaction via the computer system.

There is also a determination if any alerts should be sent in accordance with any user-defined preferences. For example, the user may want an alert if the user has spent more than $300 for the month in groceries. The financial transaction data profile can perform such operation in response to grouping all of the transaction data associated with the group of payees in a predetermined groceries category.

In block 108, the financial transaction data profile is stored in a server, and/or database. The stored profile is then presented to a user online when the user logs into the user's online account (such as via an online banking system), by mailing a copy to a user's physical address, or by any other means of transmitting the financial transaction data profile to the user or other entity.

Block 109 illustrates an embodiment where an organization recommends a product and/or service to a user based on the financial transaction data or the financial transaction data profile. The recommendations may be directed to various products or services of a financial institution, including recommendations for bank accounts, investment products, savings plans, loan restructuring, and other products or services based on a user's financial transaction data. Other products and/or services can be offered based on a wide variety of user data such as purchases, other product or service usage, and user plans. In some embodiments, recommendations are sent out based on preferences, which are user preferences, default preferences, or any other preferences. In one embodiment, the default preferences are those preferences that are determined by the organization providing the recommendation, such as a financial institution or other business or organization. For example, a bank may recommend that a customer switch from a current account to a more beneficial account if the customer's regular account activity is encumbered by paid sums for services and restrictions. The recommendations are sent to the user in compliance with privacy guidelines, data usage guidelines, or any other type of law or regulation. In other embodiments, the user "opts in" or "opts out" to receive or not to receive product recommendations from the recommending organization as discussed in further detailed later with regard to FIG. 3.

In block 110, alerts are transmitted to the user when a triggering event occurs. Triggering events include any event where a threshold is reached or a predefined condition is fulfilled, such as when a user reaches a spending limit, when check funds are ready for use, when a check has been deposited, or any other predefined condition or event occurs in the financial transaction data profile. In another embodiment, alerts are sent out based on preferences. Preferences are user preferences, default preferences, or any other preferences. In one embodiment, the default preferences are those preferences that are determined by the sending organization, such as a financial institution or other business or organization. For example, a financial institution may send an alert when a customer's checking balance reaches a certain minimal level or in instances where the customer's account activity for a particular month is different from previous months. The default preferences are configured to comply with privacy guidelines, data usage guidelines, or any other type of law or regulation. The user may "opt in" or "opt out" to receive or not to receive alerts based on default or other preferences as is discussed later in more detail with regard to FIG. 2. The preferences also determine the method for sending the alert to the user. The alert method may be a text message, an email, a phone call, a fax, and/or any other means. For example, a financial institution may call the user when financial transactions associated with a particular customer's account occurs in locations that do not correspond with the customer's previous account activity. Such alerts may be used by financial institutions to protect customers from having their identities assumed by another, detect and prevent schemes that create the appearance that money obtained from illegitimate activities originated from a legitimate source, and the like.

Although the above steps in FIG. 1 illustrate a general example of some embodiments of the present invention, it should be understood that the present invention may include various other embodiments. Some of these other embodiments are described below with regard to FIGS. 2-3.

FIG. 2 is a flow chart of a method 200 for creating a financial transaction data profile where a user sets preferences for the financial transaction data profile in accordance with some embodiments. In block 202, a user sets or defines preferences for the financial transaction data profile. As previously disclosed, the user is a customer, a client, a bank account owner, or any person or organization with authority to access the financial transaction data profile or set user preferences.

In block 204, the user undergoes an authentication process by entering a user identification sequence and password to gain access to an online account. Further verification procedures such as answering a predetermined security question, typing in distorted text to verify human input, or any other verification procedure may also be used.

In some embodiments, the user sets periodic statement preferences as illustrated in block 206. In one embodiment, the user designates or defines categories that will include the specified financial transaction data or images, as described in further detail below with regard to FIG. 5.

In block 208, the user assigns financial transaction data or financial instrument images to at least one category based on the information associated with the financial transactions or based on any other criteria. As previously discussed, the financial transaction data may include the payee name, the purpose of the transaction, the check or other reference number, the transaction amount, or any other information related to a transaction. For example, the user may assign checks written to a building supply chain to a "home improvement" category and assign debit card transaction that take place within the first two weeks of December into a "holiday gift" category. In another embodiment, the user may opt to exclude some transactions from the periodic statement. In the example above, the user could write "exclude from home improvement category" in the subject line of check to exclude the building supply purchase from the category. The user may also set preferences after the periodic statement is stored or presented to the user. For example, the user could rearrange past and current periodic statements that are organized according to default preferences by setting new preferences.

In block 210, the user sets preferences for the periodic statement by choosing a format for presenting the organization of the financial transaction data from a list of options or by entering financial transaction data into designated fields. In one embodiment, the user determines how detailed the periodic statement should be by setting preferences that indicate which information should be included in the statement. For example, a user may choose to have only the category names included in a pie chart and not have any of the financial transaction details associated with those categories in the periodic statement.

In blocks 212-218, the user predefines preferences for financial transaction alerts. In block 214, the user selects or enters at least one triggering condition into the designated fields. In some embodiments, the triggering conditions may be an amount or percentage threshold, a date or period, an occurrence of an event, a periodic statement factor, or any other condition. In block 216, the user chooses a means for receiving the alert as discussed above with regard to FIG. 1. For example, the user may set the alert preferences so that the user will be notified through a text message that the grocery spending category has reached a predetermined maximum percentage of all expenditures for the month. In block 218, the user chooses to receive or not to receive alerts based on default preferences by selecting an "opt in" or "opt out" option. For example, a bank customer may not want to receive an alert every time the customer uses a bank card in countries outside the U.S. and can opt out of receiving such default alerts.

FIG. 3 is a flow chart of a method 300 for creating a financial transaction data profile where a user sets preferences for the financial transaction data profile in accordance with some embodiments. In block 302, a user sets preferences for the financial transaction data profile. As previously defined, the user is a customer, a client, a bank account owner, or any person or organization with authority to access the financial transaction data profile or set user preferences.

In block 304, the user undergoes an authentication process by entering a user identification sequence and password to gain access to an online account. Further verification procedures such as answering a predetermined security question, typing in distorted text to verify human input, or any other verification procedure may also be used.

In blocks 306-308, the user predefines preferences to determine a method for paying bills online. In one embodiment, the user chooses a bill payment option based on the financial transactional data and/or the financial transaction data profile as shown in block 308. For example, the user may indicate that all payments to a particular business or category should be paid by automatic withdrawal from a checking account.

In blocks 310-312, the user predefines preferences for product and/or service recommendations. In block 312, the user chooses to receive or not to receive product and/or service recommendations based on default preferences by selecting an "opt in" or "opt out" option. For example, a bank sends product recommendations only to customers who check or select a box indicating that they wish to receive such recommendations and does not send the recommendations to customers who do not check the box. In block 314, the user enters or selects the type of product and/or service recommendation to be received. For example, a user may choose to only receive product or service recommendations relating to retirement and saving programs and may choose to block all other types of product or service recommendations.

Figure 4:
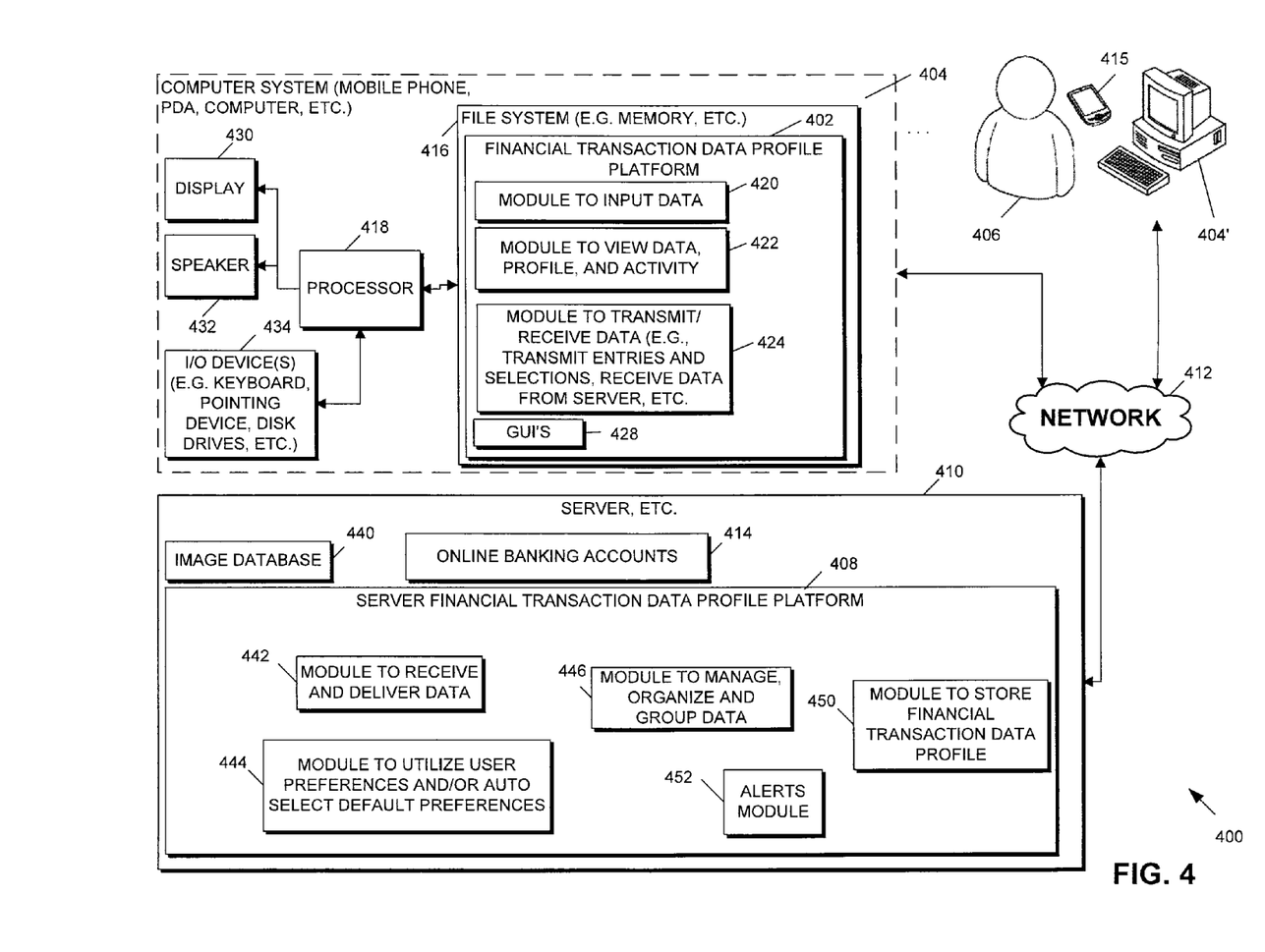
FIG. 4 is a block schematic diagram of an exemplary system for a financial transaction data profile in accordance with an embodiment.

FIG. 4 is a block schematic diagram of an example system for the financial transaction data profile in accordance with some embodiments. The system 400 includes a financial transaction data profile platform 402 operable on a computer system 404, or similar device of a user 406 or client. Alternatively, or in addition to the financial transaction data profile platform 402 on the user computer system 404, the system 400 includes a server financial transaction data profile platform 408 operable on a server 410 and accessible by the user 406 or client on computer system 404 via a network 412.

Online banking accounts 414 of system 400 are operable on and/or communicative with the server 410 and are accessible by a plurality of users 406 using an Internet browser on their respective computer systems 404 or PDA 415. The server 410 is any computer system or device that is capable of communicating with the network 412. The online banking accounts 414 include interest-bearing, investment accounts, credit accounts, and other types of accounts maintained by the financial institution or other entity associated with the financial institution. It should be understood that the online banking accounts may be accounts other than those associated with the financial institution, such as service accounts, products, etc. at entities other than a financial institution.

The network 412 is the Internet, a private network, wireless network, or other network. Each computer system 404' is similar to the exemplary computer system 404 and associated components illustrated in FIGS. 2-3.

The financial transaction data profile platform 402 and/or 408 is a self contained system with embedded logic, decision making, state based operations and other functions that operates in communication with the online accounts 414. The self contained system allows financial institutions, individuals, services, and the like to interact. The financial transaction data profile platform 402 is stored on a file system 416 or memory of the computer system 414. The platform 402 is accessed from the file system 416 and runs on a processor 418 associated with the computer system 404. The processor 418 is any device or system that executes the modules or platforms described herein.

The methods 100-300 are embodied in or performed by the financial transaction data profile platform 402 and/or the server financial transaction data profile platform 408. For example, in one embodiment, the methods 100-300 are performed by the financial transaction data profile platform 402. In another embodiment of the invention, the methods 100-300 are performed by the server financial transaction data profile platform 408. In a further embodiment of the present invention, some of the features or functions of the methods 100-300 performed by the financial transaction data profile platform 402 on the user's computer system and other features or functions of the methods 100-300 are performed on the server financial transaction data profile platform 408.

The financial transaction data profile platform 402 includes an inputting data module 420. The inputting data module 420 allows the customer or other user 406 to input user preferences as described above with regard to FIGS. 2-3. Various other data might also be entered such as login information, user credentials, change of address requests, customer service questions, and other information associated with the online account. The inputting data module 420 is accessed or activated whenever the customer or other user 406 desires to input information and calls GUIs 428 or other modules.

The financial transaction data profile platform 402 also includes a viewing module 422. This viewing module 422 allows the user 406 to logon to an online interface managed by the financial institution, or other entity, to retrieve financial transaction data associated with the customer. The financial transaction information includes the amount of money in a bank account, history of account activity, deposits, withdrawals, expenditures, and any other transactional information. Additionally, the viewing module 422 allows the user 406 to inspect the financial transaction profile, such as a weekly report or a monthly statement and associated alerts and recommendations. In one embodiment, any online account information or data is saved, uploaded or transferred to a web site or intranet of the lender or a third party service provider via an interface. Customers can view activity within the online account at any time. Nonetheless, it should be understood that the methods and systems of the methods 100-300 can be implemented via a web-based interactive system connected to a computer system 404 and server 410. For example, the online account activity can be implemented as a portion of an online banking interface so that the customer can readily access any information associated with her online account.

The financial transaction data profile platform 402 also includes a transmitting module 424. This transmitting module 424 transmits any information from the user's computer 404 to the server, such as the user preferences, requests, responses, customer data, account information and other account information.

The user computer system 404 also includes a display 430 and a speaker 432 or speaker system. The display 430 presents any information on the screen to the user 406. Any GUIs 428 associated with the financial transaction data profile is also presented on the display 430. The speaker 432 presents any voice or other auditory signals or information to the user 406.

The user computer system 404 also includes one or more input devices, output devices or combination input and output device, collectively I/O devices 434. The I/O devices 434 include a keyboard, computer pointing device or similar means to enter information into various GUIs as described herein. The I/O devices 434 also include disk drives or devices for reading computer media including computer-readable or computer-operable instructions.

The financial transaction data profile platform 408 presents one or more predetermined GUIs 428 to permit the establishment, input, and management of the financial transaction data profile system 400 and methods 100-300. These GUIs 428 may be predetermined and presented in response to the user indicating the user would like to enter or receive information and/or settings. The GUIs 428 are generated by the financial transaction data profile platform 402 and/or the server financial transaction data profile platform 408 and are presented on the display 430 of the computer system 404. The GUIs 428 also include GUIs to permit the customer, financial institution representative or owner 406 to manage the financial transaction data profile actions and services.

The server financial transaction data profile platform 408 includes a module (not shown) to receive images and transactional data from database 440. The database 440 is operable on or communicable with the server 410. The database 440 may contain financial transaction data and financial instrument images.

The server financial transaction data profile platform 408 further includes a receive/deliver data module 442. The receive/deliver module 442 performs various tasks with respect to receiving data from a customer's computer 404 and/or online accounts 414 and also for transmitting data thereto. The data received includes user preferences, requests, updates, and other information associated with the online accounts 414. For example, the receive/deliver data module 442 may receive input data from the module to input data 420. Any received information is then distributed to other modules in the server financial transaction data profile platform 408. By way of another example, the module 442 receives data from the online accounts 414 and delivers such data to the customer's computer 404.

The server financial transaction data profile platform 408 also includes a preferences module 444. This preferences module 444 implements any received user preferences. If user preferences are not entered, not received, or fail to encompass all preference options or events, module 444 automatically selects default preferences for the financial transaction profile. For example, the preferences module 444 will automatically select a default option to send the customer an alert when online account security is breached even though the user does not enter such a preference option.

The server financial transaction data profile platform 408 also includes a management module 446 to manage, organize, and group financial data. The management module 446 applies the default and/or user preferences criteria in creating the financial transaction data profile. For example, the module 446 can be used to create a periodic statement that groups financial instrument images by payee name according to some default preference criteria. Any other operations of methods 100-300 are also performed by this module 446.

The server financial transaction data profile platform 408 further includes a profile storage module 450 to store the financial transaction data profile. This profile storage module 450 allows the user 406 to access the financial transaction data profile after it is created. Based on the information contained in the financial transaction data profile, the module 450 may also store product and/or service recommendations which are also accessible to the user 406 on online accounts 414.

The server financial transaction data profile platform 408 also includes an alerts module 452. The alerts module 452 may include any alert that the financial institution or other organization may send to the customer or user 406, any alert as predefined by the customer or user 406 in the user preferences, any error message alerts, or any other type of alert or notification. For example, the user may receive an alert as a result of a financial transaction limitation defined in the user preferences or the use may receive an alert when access to the online accounts 414 is restricted due to maintenance. The alerts module 452 sends alerts by email, text, telephone, fax, or any other electronic or non-electronic means.

It should be understood that embodiments of the present invention may be implemented via an online banking system, as is described previously with regard to FIG. 4. The online banking system includes interfaces. Exemplary online banking graphical user interfaces (GUIs) are shown in FIGS. 5-8.

Figure 5:
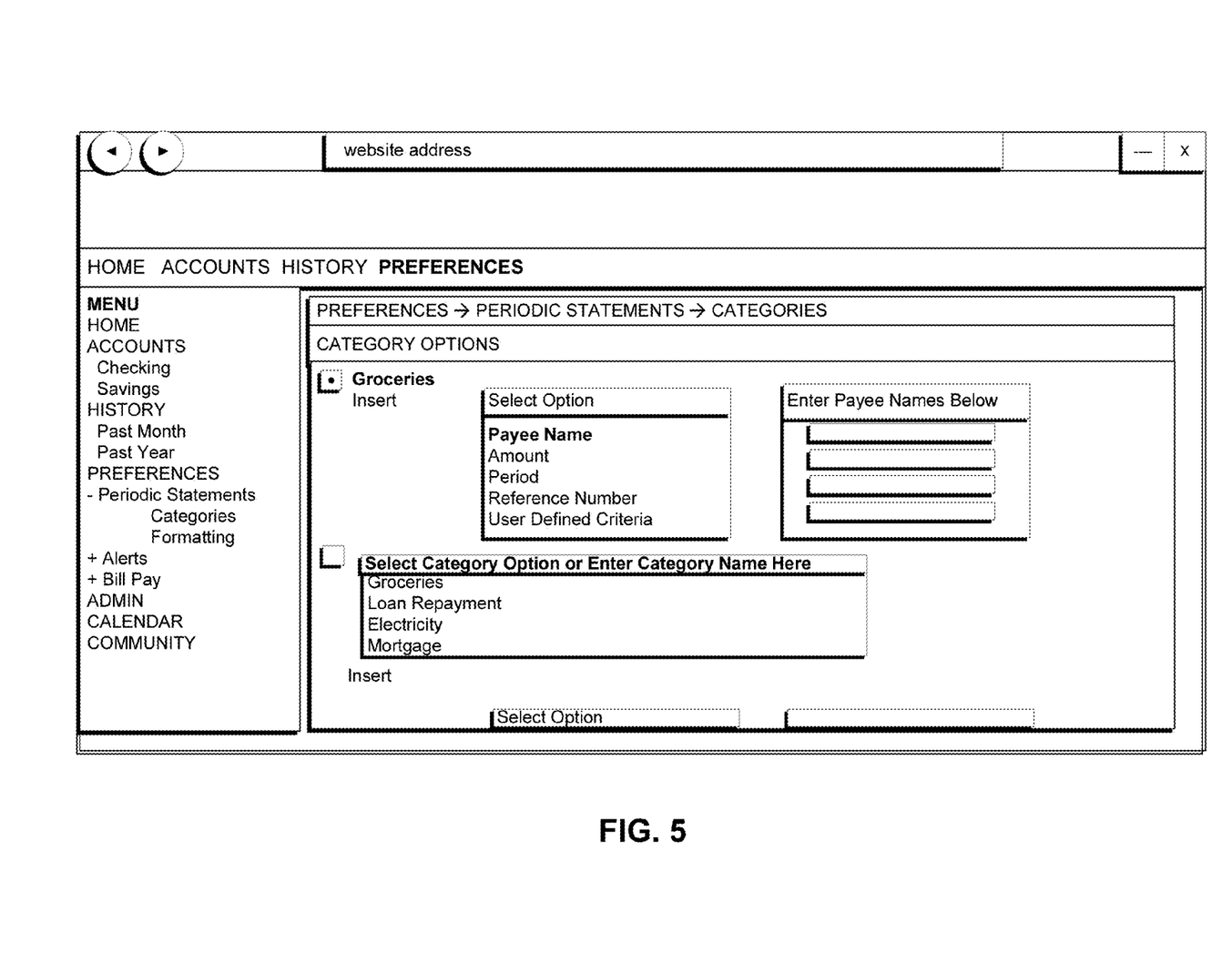
FIG. 5 is an example of a graphical user interface illustrating preference options presented to a user in accordance with another embodiment.

In FIG. 5, the online banking GUIs show an online banking profile of a customer at a bank. The customer sets preferences by clicking on the "Categories" link under "Preferences" on left side of the interface. Upon selection of such link, a new GUI is opened for selecting the type of preferences to be entered as shown in FIG. 5.

The GUI of FIG. 5 displays a set of fields for grouping financial transaction data or images into categories. The user defines a category by clicking on the box next to the category field and either typing in a category name or selecting a category from a list of options. Once a category has been designated, the user then determines which information to place into the category by either selecting particular criteria from a list of options or by entering user defined criteria. For example, the user may group certain financial instruments into a grocery category by entering the payee names associated with groceries into the designated field.

In some embodiments, the financial data profile automatically groups the financial instruments according to various parameters of the instruments according to default settings. For example, if the financial instruments are checks, the imaged checks could be grouped together according to the payee names, the amount of money the checks represent, the signatories on the checks (e.g., user, the user's son, the user's spouse, etc.), the dates the checks were presented for payment, the dates the checks were written, and other possible way to group the checks according to information or instructions present on the checks.

Figure 6:
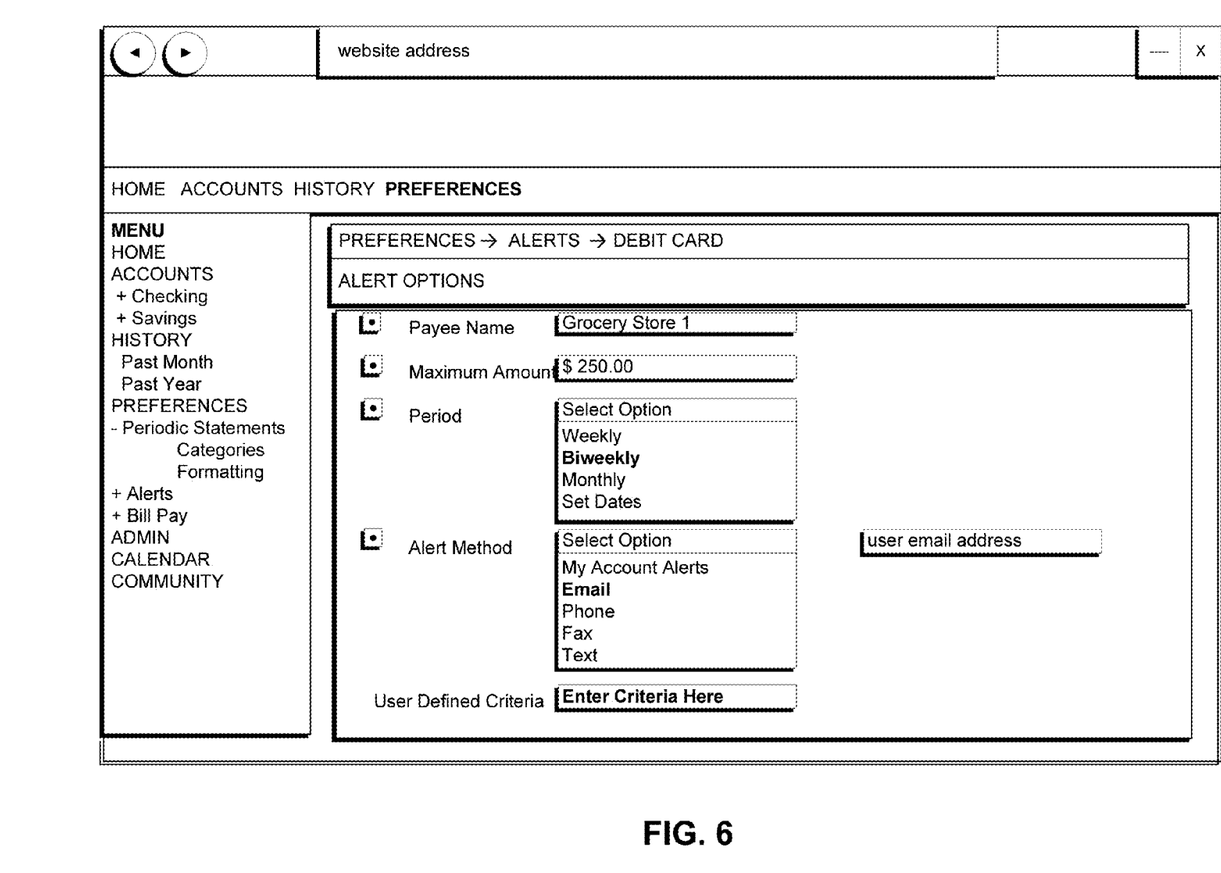
FIG. 6 is an example of a graphical user interface illustrating other preference options presented to a user in accordance with another embodiment.

In one embodiment, as illustrated in FIG. 6, the user sets preferences by clicking on the "Alerts" link under "Preferences" on the left hand side of the interface. Once the alert options GUI opens, the user then selects from options such as payee name, maximum amount, period, and/or alert method and enter the appropriate information in the designated fields. Moreover, the user may enter user-defined criteria into the designated field. The user-defined criteria allow the user to define any alerts that are not present in the GUI. The alert method options may further include a field for entering the address, phone numbers or other contact information needed to contact the user.

Figure 7:
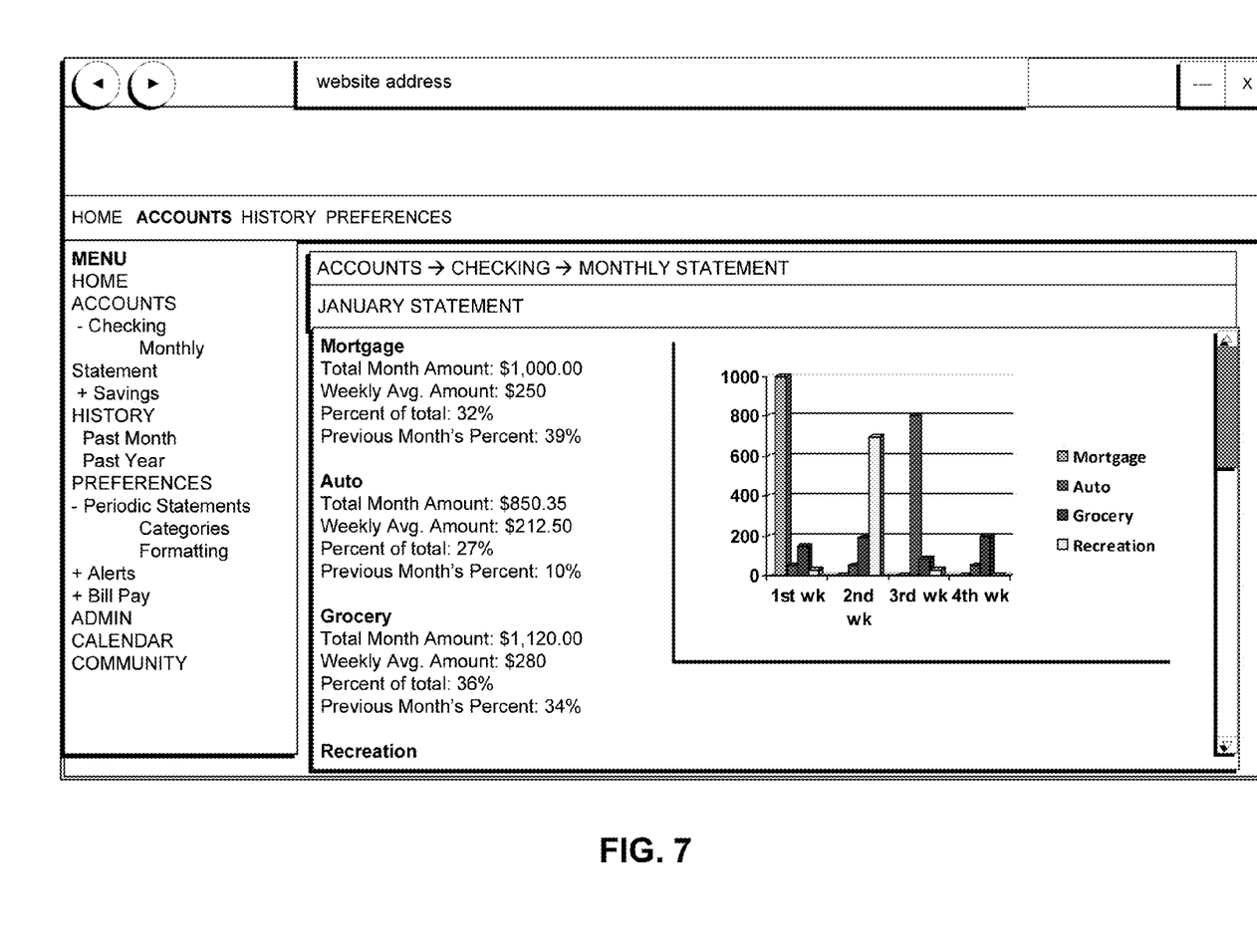
FIG. 7 is an example of a graphical user interface illustrating a portion of a financial transaction data profile in accordance with another embodiment.
Figure 8:
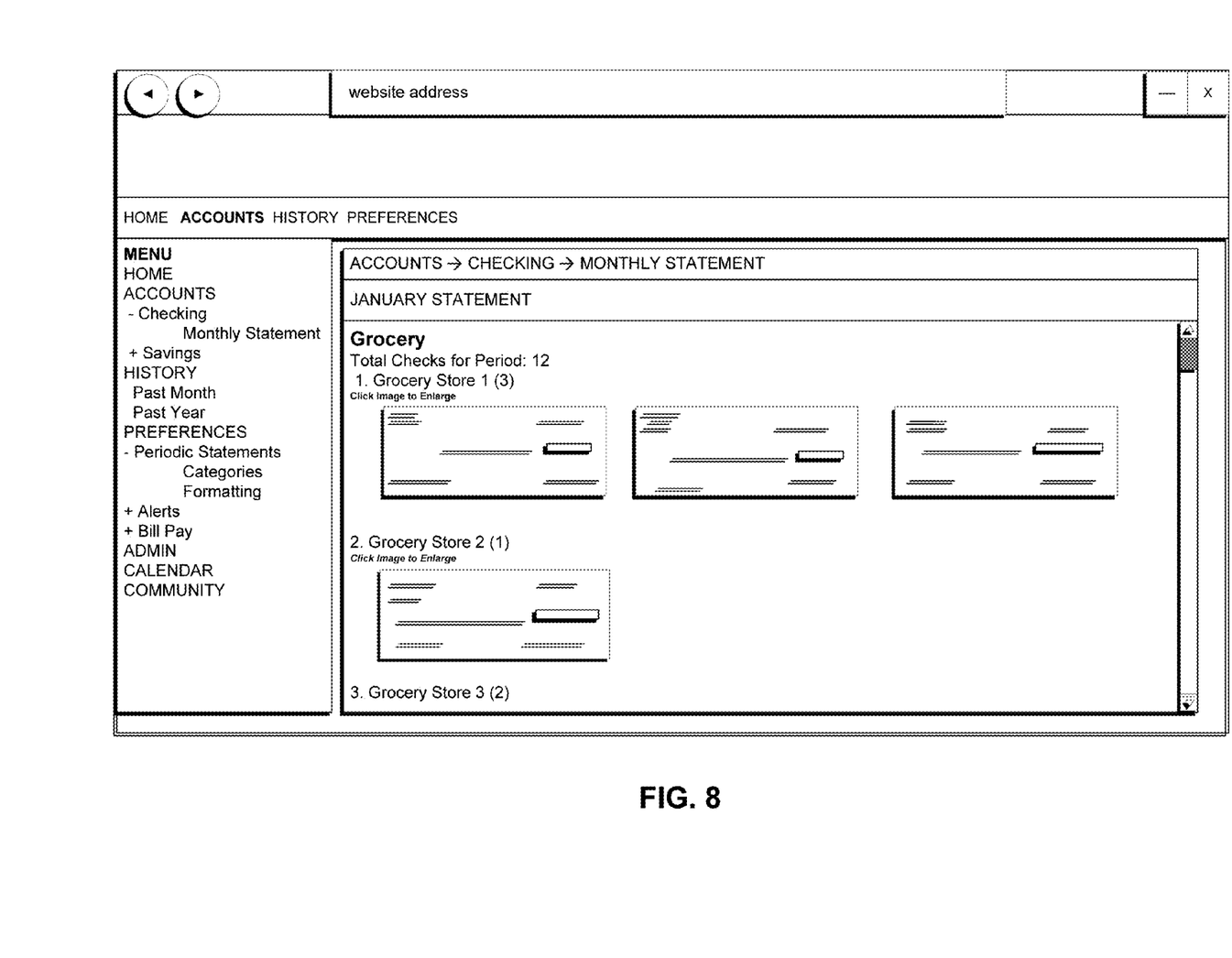
FIG. 8 is an example of a graphical user interface illustrating another portion of a financial transaction data profile in accordance with another embodiment.

FIGS. 7-8 illustrate exemplary periodic statement formats. In one embodiment, the user clicks on the "Monthly Statements" link under "Accounts" on the left hand side of the screen to access a statement. In FIG. 7, the financial transaction data is illustrated as organized into four categories and is presented in a textual, numerical, and graphical form in the statement. The total amounts spent per week in each category are represented in a bar graph but can be represented in any other format. Furthermore, the weekly average of the amounts and percents of the total expenditures for the current and previous months are listed under each category on the left hand side of the statement. This information was obtained in accordance with the previously discussed methods 100-200.

In FIG. 8, check images are grouped and presented by category in the monthly statement. The user may access a larger version of each image to view its contents by clicking on a thumbnail. This information was obtained in accordance with the previously discussed methods 100-200. For example, the checks illustrated were presented for payment and scanned into an ATM or at a bank branch as check images. Transactional data, such as the payee name, for each check was extracted from the image. This transactional data is then associated with each check. Specifically, the checks are associated with each extracted respective payee name. The checks were then grouped by the payee names and presented in the financial data profile in such groupings. Other information can also be provided in the financial transaction profile, such as the sum of the checks in each category, the total number of checks in each category, the payee name for each category, when the checks were deposited, when the checks were written, security alerts on the checks, and the like.

The online banking interface includes other options or features in the interface, such as viewing the history of transactions in the account (shown as the "History" link), scheduling events (shown as the "Calendar" link), and setting up administrative preferences (shown as the "Admin" link).

It should be noted that various features may be included in the online banking system, such as transmitting alerts and/or messages to the customer via a handheld electronic device or computer. Furthermore, it should be understood that the online banking interface illustrated in FIGS. 5-8 are presented herein for exemplary purposes and may be in any other form to achieve various embodiments of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computerized method for developing a financial transaction data profile, the method further comprising:
receiving a plurality of financial documents, wherein the financial documents comprise transactional data, wherein the transactional data comprises a plurality of transactions that occur over a period of time and an instruction to exclude a transaction of the plurality of transactions associated with one financial document of the plurality of financial documents, the instruction to exclude inputted by a user in the one financial document of the plurality of financial documents;
extracting at least a portion of the transactional data from the plurality of financial documents;
uploading the transactional data extracted from the plurality of financial documents to a computer system;
organizing the transactional data in the computer system so that the transactional data is grouped into at least one category comprising at least one transaction;
determining a purpose of the at least one transaction of the at least one category based on a type of account used in the at least one transaction and a time period associated with the at least one transaction;
removing a categorized transaction of the at least one transaction from the at least one category based on the instruction to exclude;
sending an alert upon exceeding a maximum percentage threshold, wherein the maximum percentage threshold is based on the total value of the at least one transaction that is grouped into the at least one category divided by the total value of the plurality of transactions; and
storing the categories in the computer system for presentation to a user in a financial transaction data profile.

2. The method of claim 1, wherein the transactional data comprises an amount of a transaction.

3. The method of claim 1, wherein the transactional data comprises a payee name.

4. The method of claim 1, wherein the transactional data comprises a type of transaction.

5. The method of claim 1, wherein the transactional data comprises a date of a transaction.

6. The method of claim 1, wherein the financial documents comprise a check.

7. The method of claim 1, further comprising transmitting the financial transaction data profile to a physical address.

8. The method of claim 1, further comprising:
receiving a plurality of images, each of the plurality of images representing a different financial instrument;
scanning the image to extract at least a portion of transactional data embedded in each financial instrument;
uploading the plurality of images and the transactional data to the computer system;
organizing the plurality of images in the computer system so that plurality of images are categorized by the transactional data into one or more categories; and
storing the one or more categories in the computer system for presentation to the user via the financial transaction data profile.

9. The method of claim 8, further comprising receiving pre-define preferences from the user related to organizing the transactional data into at least one category on the user's computer.

10. The method of claim 1, further comprising:
receiving input from the user to opt in to receive a product or service recommendation; and
sending the product or service recommendation to the user based on the financial transaction data profile.

11. The method of claim 1, further comprising:
receiving a user preference for a presentation format for the financial transaction data profile on the user's computer;
assigning the presentation format to the financial transaction profile; and
storing the presentation format to the computer system.

12. The method of claim 1, wherein the transaction data is grouped into at least one category based on signatories of the financial documents.

13. A computerized method for developing a financial transaction profile, the method comprising:
receiving a plurality of images, each of the plurality of images representing the entire contents of a different financial instrument, each financial instrument comprising a payee name such that the payee name is embedded in each image, wherein at least one image of the plurality of images comprises and an instruction to exclude at least one financial instrument associated with the at least one image, the instruction to exclude inputted by a user in the at least one financial instrument and embedded in the at least one image;
scanning each image to extract the payee name from each image into text;
uploading each image and each associated payee name to a computer system;
organizing each image into categories associated with each payee name such that all images having the same payee name are grouped together into a common category;
determining a purpose of one or more categorized images based on a type of account and a time period associated with the one or more categorized images;
removing the at least one image from the common category based on the instruction to exclude;
storing the categories in the computer system for presentation to a user in a financial transaction data profile; and
presenting the financial transaction data profile to the user, wherein the financial transaction data profile comprises the images having the same payee name that are grouped together into the common category.

14. The method of claim 13, further comprising:
receiving user preferences;
organizing the transactional data from the plurality of financial instruments into the financial transaction data profile based on the preferences; and
storing the financial transaction data profile to a computer system.

15. The method of claim 13, wherein the financial transaction data profile comprises a periodic statement.

16. The method of claim 13, further comprising receiving user preferences for methods of paying a bill based on the financial transaction data profile.

17. The method of claim 13, further comprising:
receiving input from the user to opt in to receive a product or service recommendation; and
sending a product or service recommendation to the user based on the financial transaction data profile.

18. The method of claim 13, further comprising:
receiving user preferences for a method of receiving alerts, wherein the user preferences comprise at least one condition; and
sending the alert to the user by the method when the condition occurs.

19. The method of claim 18, wherein the preferences relate to privacy settings and data usage settings.

20. A method for creating product or service recommendations, the method further comprising:
receiving a plurality of financial instruments, wherein the financial instrument comprises transactional data, wherein the transactional data comprises a plurality of transactions that occur over a period of time and an instruction to exclude a transaction of the plurality of transactions associated with one financial document of the plurality of financial documents, the instruction to exclude inputted by a user in the one financial document of the plurality of financial documents;
extracting at least a portion of the transactional data from the plurality of financial instruments;
uploading the transactional data extracted from the plurality of financial instruments to a computer system;
organizing the transactional data in the computer system so that the transactional data is grouped into at least one category comprising at least one transaction;
determining a purpose of the at least one transaction of the at least one category based on a type of account used in the at least one transaction and a time period associated with the at least one transaction;
removing a categorized transaction of the at least one transaction from the at least one category based on the instruction to exclude;
sending an alert upon exceeding a maximum percentage threshold, wherein the maximum percentage threshold is based on the total value of the at least one transaction that is grouped into the at least one category divided by the total value of the plurality of transactions;
storing the at least one category in the computer system for presentation to a user in a financial transaction data profile; and
selecting a product or service recommendation based on the financial transaction data profile.

21. The method of claim 20, further comprising receiving input from the user to opt in to receive a product or service recommendation; and sending the product or service recommendation to the user.

22. The method of claim 20, further comprising receiving user preferences for the type of product or service recommendation to be received by the user.

23. The method of claim 20, wherein the at least one category comprises a type of transaction.

24. The method of claim 23, wherein the type of transaction comprises a purchase transaction.

25. The method of claim 23, wherein the type of transaction comprises deposits to an account.

26. The method of claim 20, wherein the at least one category comprises one or more payee names.

27. An apparatus for developing a financial transaction data profile, the apparatus comprising:
a processor configured to:
scan a plurality of images, each image representing a financial instrument, the financial instrument comprising transactional data, wherein the transactional data comprises a plurality of transactions that occur over a period of time and an instruction to exclude a transaction of the plurality of transactions associated with one financial document of the plurality of financial documents, the instruction to exclude inputted by a user in the financial instrument;
extract the transactional data embedded in the plurality of images;
organize the transactional data from the plurality of images so that the transactional data is grouped into at least one category comprising at least one transaction;
determine a purpose of the at least one transaction of the at least one category based on a type of account used in the at least one transaction and a time period associated with the at least one transaction;
remove a categorized transaction of the at least one transaction from the at least one category based on the instruction to exclude;
send an alert upon exceeding a maximum percentage threshold, wherein the maximum percentage threshold is based on the total value of the at least one transaction that is grouped into the at least one category divided by the total value of the plurality of transactions; and
store the at least one category for presenting to the user in a financial transaction data profile.

28. The apparatus of claim 27 further comprising a user interface configured to present the financial transaction profile.

29. The apparatus of claim 28, wherein the user interface is further configured to allow the user to enter or select user preferences.

30. The apparatus of claim 29, wherein the processor is further configured to organize the transactional data into the at least one category in accordance with the user preferences.

31. The apparatus of claim 27, wherein the processor is further configured to send product or service recommendations based on the financial transaction profile.

32. The apparatus of claim 29, wherein the processor is further configured to pay a bill associated with the transactional data based on the user preference.

33. A non-transitory computer readable medium for developing a financial transaction data profile comprising computer program code embodied therein, the computer program code, when executed on a computer, causes the computer to implement a method comprising:
extracting transactional data from a plurality of financial instruments, the transactional data comprising a plurality of transactions that occur over a period of time and an instruction to exclude a transaction of the plurality of transactions associated with one financial document of the plurality of financial documents, the instruction to exclude inputted by a user in the one financial document of the plurality of financial documents;
organizing the transactional data from the plurality of financial instruments so that the transactional data is grouped into at least one category comprising at least one transaction;
determining a purpose of the at least one transaction of the at least one category based on a type of account used in the at least one transaction and a time period associated with the at least one transaction;
removing a categorized transaction of the at least one transaction from the at least one category based on the instruction to exclude;
sending an alert upon exceeding a maximum percentage threshold, wherein the maximum percentage threshold is based on the total value of the at least one transaction that is grouped into the at least one category divided by the total value of the plurality of transactions; and
storing the at least one category and transactional data in the computer system for presenting to the user in a financial transaction data profile.

34. The non-transitory computer readable medium of claim 33, wherein the method further comprising presenting the financial transaction profile.

35. The non-transitory computer readable medium of claim 34, wherein the user interface is further configured to allow user preferences to be entered or selected.

36. The non-transitory computer readable medium of claim 35, wherein the method further comprises organizing the transactional data into the categories based on the user preferences.

37. The non-transitory computer readable medium of claim 33, wherein the method further comprises sending product or service recommendations based on the financial transaction profile.

38. The non-transitory computer readable medium of claim 33, wherein the method further comprises sending alerts based on a default or user preference.

39. A system for developing a financial transaction profile, the system comprising:
a computer comprising at least one module that is configured to:
scan a plurality of images, each image representing a financial instrument, wherein each financial instrument comprises transactional data, wherein the transactional data comprises a plurality of transactions that occur over a period of time and an instruction to exclude a transaction of the plurality of transactions associated with one financial document of the plurality of financial documents, the instruction to exclude inputted by a user in one financial instrument;
convert the transactional data embedded in the images into a series of characters or numbers;
organize the transactional data from the plurality of images so that the transactional data is grouped together into at least one category comprising at least one transaction;
determine a purpose of the at least one transaction of the at least one category based on a type of account used in the at least one transaction and a time period associated with the at least one transaction;
remove a categorized transaction of the at least one transaction from the at least one category based on the instruction to exclude exclusion rule; and
send an alert upon exceeding a maximum percentage threshold, wherein the maximum percentage threshold is based on the total value of the at least one transaction that is grouped into the at least one category divided by the total value of the plurality of transactions.

40. The system of claim 39, further comprising a user interface for presenting the financial transaction profile in an online banking system.

41. The system of claim 39, further comprising a network and an online banking server coupled to the network to present online banking account information with the financial transaction profile.

42. The system of claim 39, comprises organizing the transactional data into the categories based on user preferences.

* * * * *